US012542029B2

(12) United States Patent
Bryant et al.

(10) Patent No.: US 12,542,029 B2
(45) Date of Patent: *Feb. 3, 2026

(54) GAMING DEVICE

(71) Applicant: Aristocrat Technologies Australia Pty Limited, North Ryde (AU)

(72) Inventors: Natalie Bryant, Cherrybrook (AU); John Chiaravalle, Hinchinbrook (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 290 days.

This patent is subject to a terminal disclaimer.

(21) Appl. No.: 18/127,451

(22) Filed: Mar. 28, 2023

(65) Prior Publication Data

US 2023/0237874 A1 Jul. 27, 2023

Related U.S. Application Data

(63) Continuation of application No. 16/521,370, filed on Jul. 24, 2019, now Pat. No. 11,631,300.

(30) Foreign Application Priority Data

Aug. 13, 2018 (AU) ................................ 2018902950
May 8, 2019 (AU) ................................ 2019203233

(51) Int. Cl.
*A63F 9/24* (2006.01)
*A63F 11/00* (2006.01)
(Continued)

(52) U.S. Cl.
CPC ...... *G07F 17/3244* (2013.01); *G07F 17/3211* (2013.01)

(58) Field of Classification Search
CPC .. G07F 17/32; G07F 17/3201; G07F 17/3214; G07F 17/3222
(Continued)

(56) References Cited

U.S. PATENT DOCUMENTS

D732,060 S 6/2015 Townsend
D744,001 S 11/2015 Orr
(Continued)

OTHER PUBLICATIONS

Office Action dated Aug. 19, 2020 for U.S. Appl. No. 29/701,686 (pp. 1-15).
(Continued)

*Primary Examiner* — Adetokunbo O Torimiro
(74) *Attorney, Agent, or Firm* — Armstrong Teasdale LLP

(57) ABSTRACT

A gaming device comprises a processor, a credit input device, a credit meter, a win meter, a bank meter, and a memory storing instructions, which when executed by the processor cause the processor to generate a game outcome, add any win amount resulting from the game outcome to the win meter to establish a win meter balance, upon a win amount added to the win meter satisfying the automatic bank condition, transfer the win meter balance to the bank meter, and upon a residual credit balance of the credit meter being below a desired wager amount corresponding to a desired player selection for a subsequent game after transfer of the win meter balance to the bank meter, conduct a random trial having a probability of success proportional to a ratio of the residual credit balance to the desired wager amount to determine whether to conduct the subsequent game using the desired player selection.

20 Claims, 15 Drawing Sheets

(51) Int. Cl.
  *G06F 13/00*  (2006.01)
  *G06F 17/00*  (2019.01)
  *G07F 17/32*  (2006.01)

(58) Field of Classification Search
  USPC .............................. 463/1, 20, 22, 25, 30, 39
  See application file for complete search history.

(56) References Cited

U.S. PATENT DOCUMENTS

| | | |
|---|---|---|
| D754,731 S | 4/2016 | Yun |
| D762,238 S | 7/2016 | Day |
| D764,520 S | 8/2016 | Lee |
| D768,185 S | 10/2016 | Lee |
| D777,205 S | 1/2017 | Orr |
| D779,546 S | 2/2017 | Chetzroni |
| D795,915 S | 8/2017 | Chetzroni |
| D803,881 S | 11/2017 | Hurley |
| D806,109 S | 12/2017 | Day |
| D820,307 S | 6/2018 | Jian |
| D822,712 S | 7/2018 | Butcher |
| D844,637 S | 4/2019 | Boelte |
| D847,855 S | 5/2019 | Majernik |
| D851,113 S | 6/2019 | Fuller |
| D869,501 S | 12/2019 | Lakas |
| D877,168 S | 3/2020 | Lee |
| D884,022 S | 5/2020 | Klein |
| D898,769 S | 10/2020 | Park |
| D902,948 S | 11/2020 | Fuller |
| D910,069 S | 2/2021 | Miarka |
| D912,071 S | 3/2021 | Wei |
| D913,326 S | 3/2021 | Mariani |
| D913,329 S | 3/2021 | Mariani |
| D916,127 S | 4/2021 | Dye |
| D923,050 S | 6/2021 | Kataoka |
| D924,259 S | 7/2021 | Klimer |
| D926,201 S | 7/2021 | Bryant |
| D930,694 S | 9/2021 | Dye |
| D931,884 S | 9/2021 | Bryant |
| 2003/0092483 A1 | 5/2003 | Bennett |
| 2004/0082384 A1 | 4/2004 | Walker |
| 2004/0106448 A1 | 6/2004 | Gauselmann |
| 2004/0266522 A1 | 12/2004 | Byng |
| 2007/0266343 A1 | 11/2007 | Isoda |
| 2007/0293306 A1 | 12/2007 | Nee |
| 2009/0199113 A1 | 8/2009 | Mcwhinnie |
| 2010/0281379 A1 | 11/2010 | Meaney |
| 2012/0004030 A1 | 1/2012 | Kelly |
| 2013/0191911 A1 | 7/2013 | Dellinger |
| 2013/0203482 A1 | 8/2013 | Singer |
| 2013/0217468 A1 | 8/2013 | Fujisawa |
| 2020/0051379 A1 | 2/2020 | Bryant |

OTHER PUBLICATIONS

The Waiting Game, by Sayman, android-apk.net [online], published on Oct. 23, 2018, [retrieved on Aug. 14, 2020], retrieved from theInternet <URL: https://android-apk.net/app/the-waiting-game/1437092035/> (Year: 2018).

Notice of Allowance dated Mar. 25, 2021 for U.S. Appl. No. 29/701,686 (pp. 1-10).

Office Action dated Jun. 23, 2021 for U.S. Appl. No. 16/521,370 (pp. 1-11).

Notice of Allowance dated Jul. 21, 2021 for U.S. Appl. No. 29/796,073 (pp. 1-11).

Corrected Notice of Allowability dated Aug. 20, 2021 for U.S. Appl. No. 29/796,073 (pp. 1-4).

Notice of Allowance dated Oct. 20, 2021 for U.S. Appl. No. 29/807,562 (pp. 1-11).

Notice of Allowance dated Oct. 18, 2021 for U.S. Appl. No. 29/807,571 (pp. 1-11).

Corrected Notice of Allowability dated Nov. 30, 2021 for U.S. Appl. No. 29/807,562 (pp. 1-4).

Corrected Notice of Allowability dated Nov. 30, 2021 for U.S. Appl. No. 29/807,571 (pp. 1-4).

Office Action (Non-Final Rejection) dated Mar. 14, 2022 for U.S. Appl. No. 16/521,370 (pp. 1-15).

Office Action (Final Rejection) dated Aug. 15, 2022 for U.S. Appl. No. 16/521,370 (pp. 1-13).

Office Action (Notice of Allowance and Fees Due (PTOL-85)) dated Jan. 11, 2023 for U.S. Appl. No. 16/521,370 (pp. 1-12).

Office Action (Notice of Allowance and Fees Due (PTOL-85)) dated Jan. 19, 2023 for U.S. Appl. No. 16/521,370 (pp. 1-3).

Australian Examination Report No. 1 issued in App. No. AU2019203233, dated May 2, 2024, 4 pages.

Australian Examination Report No. 2 issued in App. No. AU2019203233 dated May 1, 2025, 3 pages.

| Reel position | Reel 1 | Reel 2 | Reel 3 | Reel 4 | Reel 5 |
|---|---|---|---|---|---|
| 1 | Pic 1 | 10 | Pic 3 | Q | Pic 1 |
| 2 | Wild | Q | K | A | 10 |
| 3 | J | K | 10 | 10 | J |
| 4 | Q | A | Q | Pic 2 | Pic 2 |
| 5 | 10 | Pic 2 | K | J | A |
| 6 | A | 9 | Pic 1 | Wild | Q |
| 7 | Pic 2 | Wild | J | 9 | K |
| 8 | A | Pic 3 | K | 10 | Pic 2 |
| 9 | Q | Q | 9 | A | 9 |
| 10 | K | 10 | Q | Q | Wild |
| 11 | J | Pic 1 | 10 | J | 9 |
| 12 | 10 | Wild | Wild | K | Q |
| 13 | Pic 3 | K | Pic 2 | Wild | 10 |
| 14 | Wild | J | A | Pic 3 | Pic 3 |
| 15 | 9 | 10 | Wild | Pic 1 | A |

FIG. 3

GAMING DEVICE

CROSS-REFERENCE TO RELATED APPLICATIONS

This application is a continuation of U.S. patent application Ser. No. 16/521,370, entitled "GAMING DEVICE," filed Jul. 24, 2019, which claims priority to Australian Provisional Application No. 2018902950, entitled a "A GAMING DEVICE" filed on Aug. 13, 2018, and Australian Nonprovisional Application No. 2019203233, entitled "A GAMING DEVICE" filed on May 8, 2019, all of which are hereby incorporated herein by reference in their entirety.

FIELD

The present application relates to a gaming device.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

Some embodiments of the disclosed technology combine a bet keeper function with an auto-bank function in order to enable a player to wager residual credits after an auto-bank event. Other embodiments relate to control of display of an information area on the display of a gaming device when the gaming device provides at least one activatable function such as an auto-bank function.

In one example embodiment a gaming device comprises a processor, a credit input device, a credit meter, a win meter, a bank meter, and a memory storing instructions. When the instructions are executed by the processor, they cause the processor to control access to the bank meter such that any credit amount added to the bank meter cannot be accessed for wagering on the gaming device and a balance of the bank meter can only be accessed by a player upon entering a cash out instruction, establish a credit balance on the credit meter responsive to receipt of a monetary amount via the credit input device, The processor receives an instruction from a player specifying an automatic bank condition in respect of a win amount, receives a player selection in respect of a play of a game on the gaming device that defines a wager amount, decrement the credit balance of the credit meter by the wager amount, generates a game outcome, add any win amount resulting from the game outcome to the win meter to establish a win meter balance. In this embodiment, upon a win amount being added to the win meter satisfying the automatic bank condition, the win meter balance is transferred to the bank meter. Upon a residual credit balance of the credit meter being below a desired wager amount corresponding to a desired player selection for a subsequent game after transfer of the win meter balance to the bank meter, the processor conducts a random trial having a probability of success proportional to a ratio of the residual credit balance to the desired wager amount to determine whether to conduct the subsequent game using the desired player selection.

Another example embodiment is a method of operating a gaming device comprising a processor, a credit input device, a credit meter, a win meter, and a bank meter. The method comprises controlling access to the bank meter such that any credit amount added to the bank meter cannot be accessed for wagering on the gaming device and a balance of the bank meter can only be accessed by a player upon entering a cash out instruction, establishing a credit balance on the credit meter responsive to receipt of a monetary amount via the credit input device, receiving an instruction from a player specifying an automatic bank condition in respect of a win amount, receiving a player selection in respect of a play of a game on the gaming device that defines a wager amount, decrementing the credit balance of the credit meter by the wager amount, generating a game outcome, adding any win amount resulting from the game outcome to the win meter to establish a win meter balance. In this example, upon a win amount added to the win meter satisfying the automatic bank condition, the method further comprises transferring the win meter balance to the bank meter, and upon a residual credit balance of the credit meter being below a desired wager amount corresponding to a desired player selection for a subsequent game after transfer of the win meter balance to the bank meter, conducting a random trial having a probability of success proportional to a ratio of the residual credit balance to the desired wager amount to determine whether to conduct the subsequent game using the desired player selection.

Another embodiment provides a gaming device comprising an electronic display, a processor, a credit meter, a win meter, and a memory storing instructions. When the instructions are executed by the processor, they cause the processor to control the display to display a plurality of areas including a game outcome area in which outcomes of an electronic game of chance are displayed and an information area having a fixed size, control display of the information area, in a first mode in which an activatable function is inactive, to visually display each of the win meter, the credit meter, and a current bet amount, and a first icon corresponding to the activatable function, and responsive to activation of the activatable function, control, in a second mode, display of the information area to visually display the first icon in an extended state and to adjust display of at least one of the win meter, the credit meter, and the current bet amount relative to the first mode to accommodate display of the first icon in the extended state.

Another example embodiment is a method of operating a gaming device comprising an electronic display, a processor, a credit meter, and a win meter. The method comprises controlling the display to display a plurality of areas including a game outcome area in which outcomes of an electronic game of chance are displayed and an information area having a fixed size, controlling display of the information area, in a first mode in which an activatable function is inactive, to visually display each of the win meter, the credit meter, and a current bet amount, and a first icon corresponding to the activatable function, and responsive to activation of the activatable function, controlling, in a second mode, display of the information area to visually display the first icon in an extended state and to adjust display of at least one of the win meter, the credit meter, and the current bet amount relative to the first mode to accommodate display of the first icon in the extended state.

BRIEF DESCRIPTION OF THE DRAWINGS

FIG. 3 illustrates an example reel strip layout.

DETAILED DESCRIPTION

Figure 1:
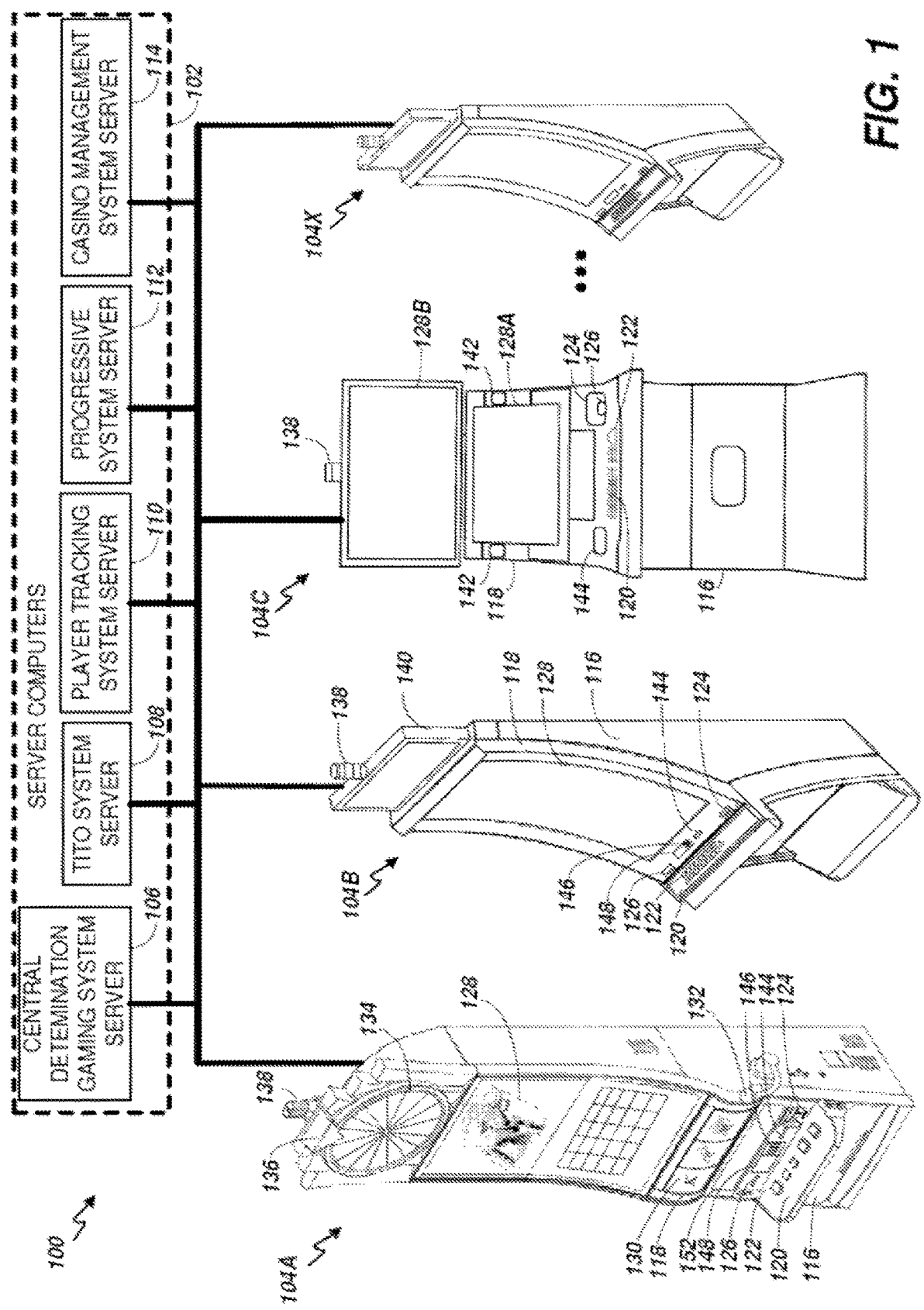
FIG. 1 is an exemplary diagram showing several EGMs networked with various gaming related servers.

FIG. 1 illustrates several different models of EGMs which may be networked to various gaming related servers. The disclosed technology can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the disclosed technology may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader to provide an additional or alternative credit input device that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
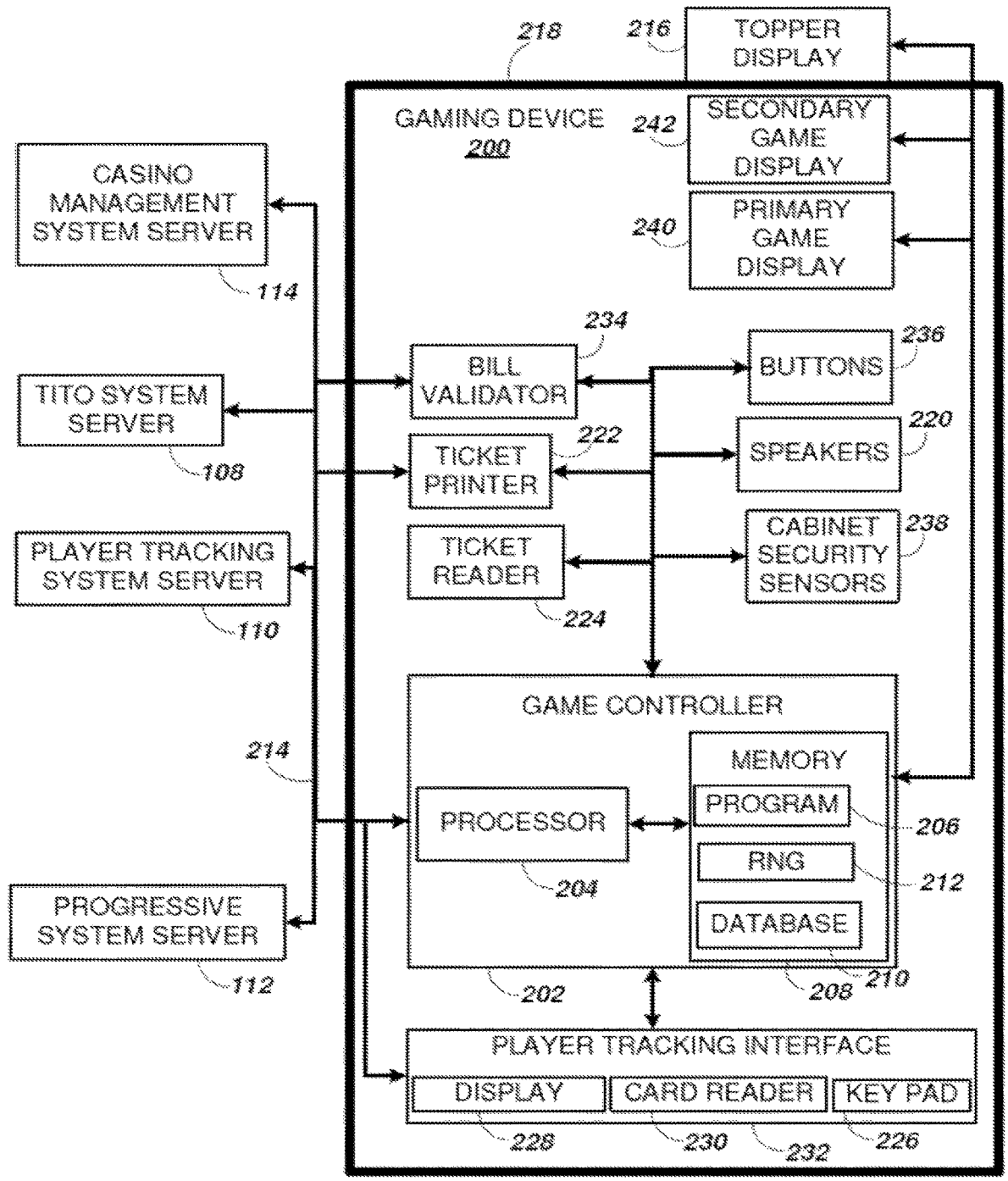
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the disclosed technology necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a credit input device such as a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming device 200. In some embodiments, a player's selection may apply across a plurality of game instances. For example, if the player is awarded additional game instances in the form of free games, the player's prior selection of the amount bet per line and the number of lines played may apply to the free games. The selections available to a player will vary depending on the embodiment. For example, in some embodiments a number of pay lines may be fixed. In other embodiments, the available selections may include different numbers of ways to win instead of different numbers of pay lines.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance by pressing a cash out button. In an embodiment the player may receive the credit balance by receiving a ticket from the ticket printer. The ticket may be "cashed-in" for money or inserted into another machine to establish a credit balance for play. In other embodiments, a cash out device such as a coin hopper may provide as an alternative to the ticket printer. In another embodiment both a cash out device such as a coin hopper and a ticket printer may be provided with the ticket printer used for cash out amounts above a threshold.

Figure 7:
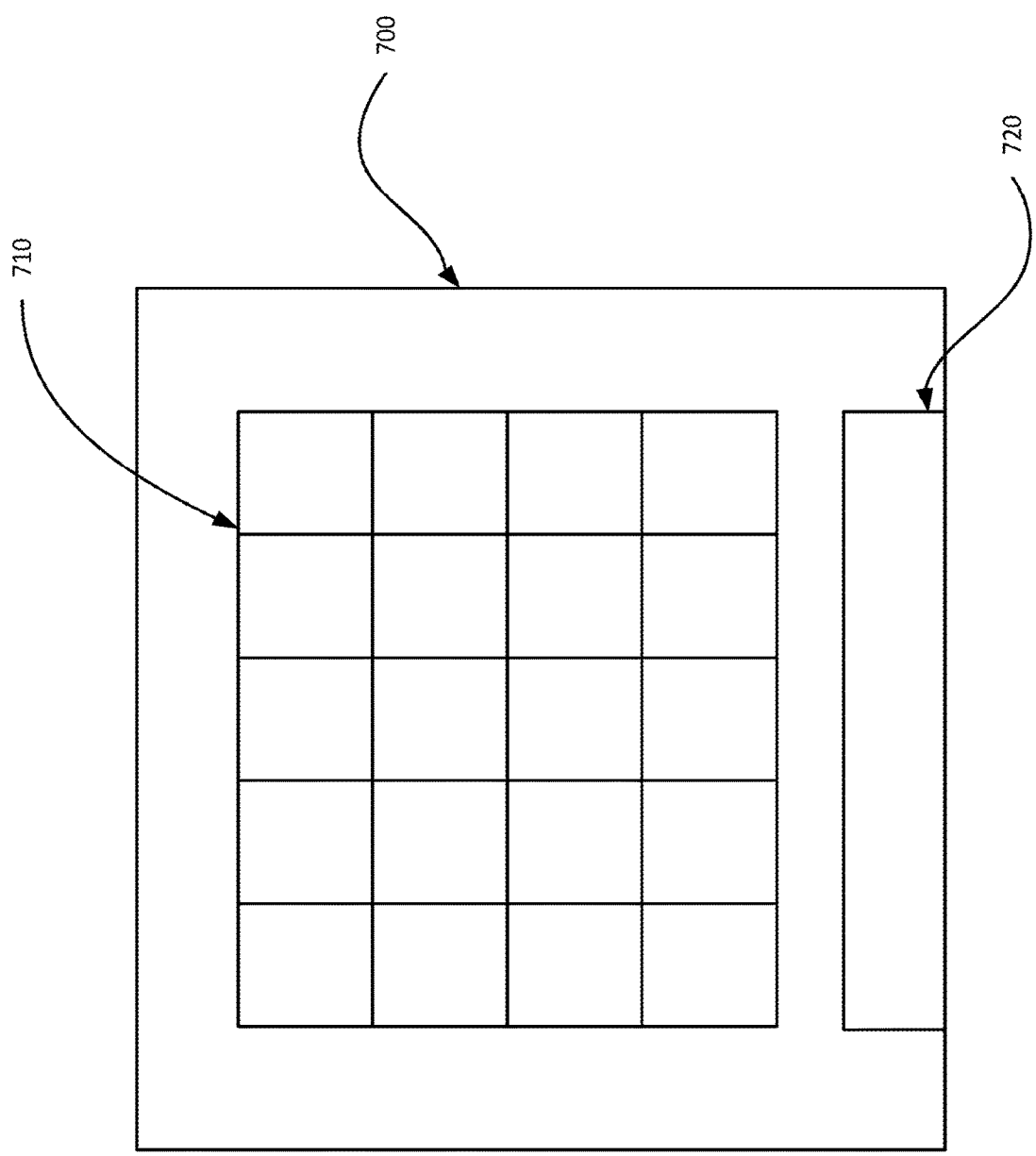
FIG. 7 is an example screen display in accordance with an embodiment of the disclosed technology.

One example, of a game that may be played on the gaming device 200 is a spinning reel game where in each game symbols are selected from reel strips for display in a game outcome area on display 240, such as the game outcome area 710 shown in FIG. 7. FIG. 3 illustrates an example of a set 300 of five reel strips 321, 322, 323, 324, 325. In the example, each reel strip has fifteen reel strip positions 301-315. Each reel strip position of each reel has a symbol, for example, a "Wild" symbol 331 occupies the sixth reel strip position 306 of the fourth reel 324. Other reels strips to those illustrated in FIG. 3 can be used, for example, reel strips where two or more wild symbols are placed at consecutive reel strip positions of a reel strip. In other examples, the reel strips could have between 30 and 100 reel strip positions. The actual length of the feature game reel strips depends on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP).

Figure 4:
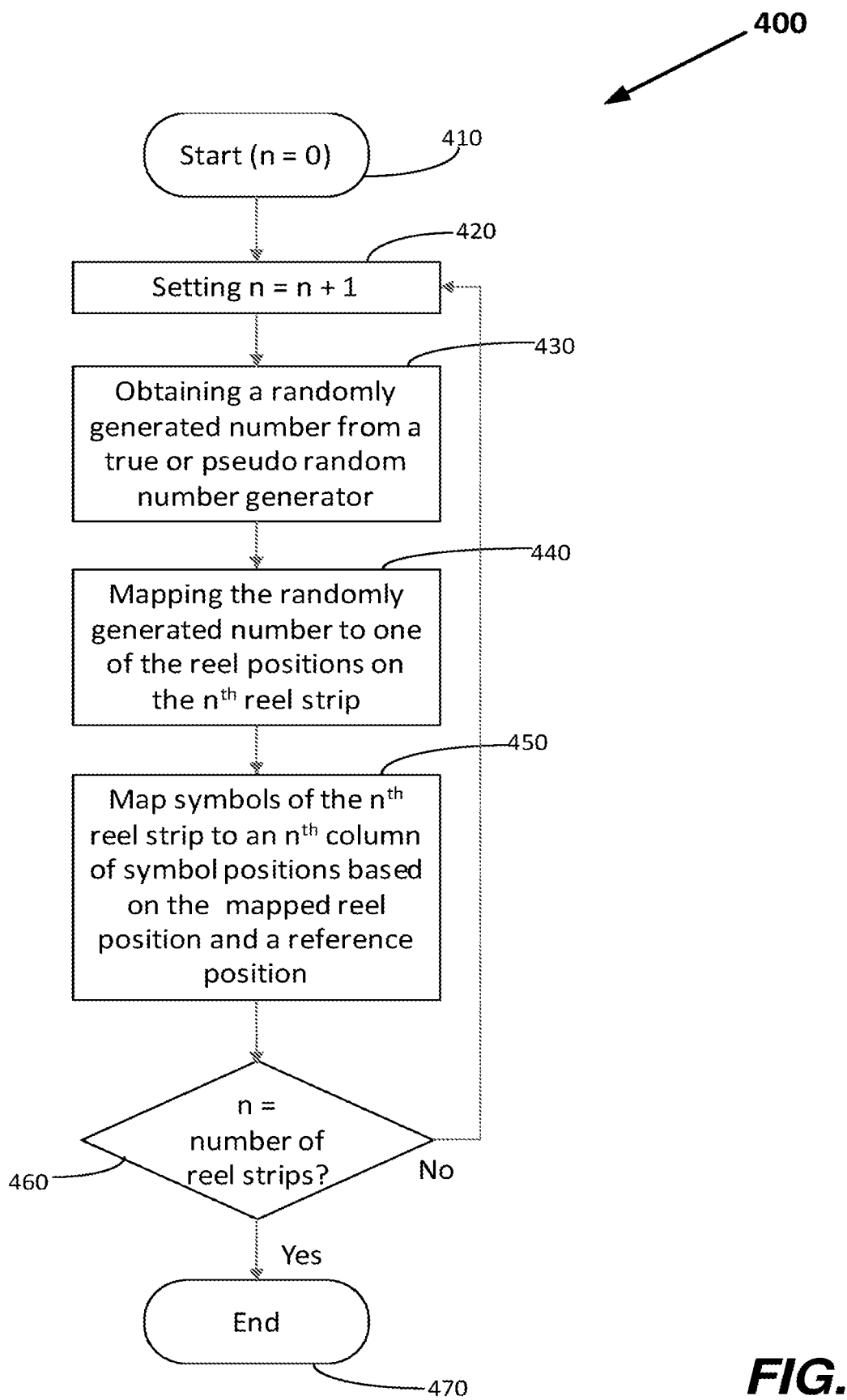
FIG. 4 is a flow chart of a symbol selection method.

FIG. 4 is a flow chart of a method 400 carried out by the processor 204 to select symbols from reel strips. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430 the processor obtains a randomly generated number from a true or pseudo random number generator 212. At step 440 the processor maps the generated number to one of the reel positions of the $n^{th}$ reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 450, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighbouring reel strip positions are also mapped to the symbol positions of the column. Referring to the example reel strips of FIG. 3, if the value returned by the RNG 212 is mapped to reel position 313, then for the first reel strip 321, "Pic3" symbol 343 is mapped to a bottom symbol position, "10" symbol 342 is mapped to a middle symbol position, and "J" symbol is mapped to a top symbol position.

At step 460, the processor 460 determines whether symbols have been selected for all of the reel strips, and if not the processor reverts to step 420 and iterates through steps 430, 440 and 450 until it is determined at step 460 that symbols have been selected from all n reel strips and mapped to all n columns of symbol positions after which the symbol selection process ends 470. Different numbers of symbols may be mapped to different numbers of symbol positions.

After the symbols of all reel strips have been mapped to symbol position, the processor 204 controls display 240 to display them at the symbol positions. The processor 204 then evaluates the symbols at the symbol positions for winning combinations based on the player selections and a pay table stored in memory 208. Any winning amounts are added to a win meter in memory 208.

In an embodiment, the gaming device 200 has components that enable it to implement an auto-bank function.

An example of auto-bank function is described in earlier Australian patent application 2001035250 the disclosure of which is incorporated herein by reference. In general, the auto-bank function allows a player to specify a winning amount that will automatically be transferred from a win meter to a separate bank meter (for example, in memory 208). The gaming device 200 is configured such that any credit amount added to the bank meter cannot be accessed for wagering on the gaming device 200 and a balance of the bank meter can only be accessed by a player upon the player entering a cash out instruction.

The intention behind an auto-bank function is to enable a user to control the amount they spend and prevent them from spending their winnings or winnings above a certain threshold on the gaming device they are playing. For example, by banking all wins above a certain dollar or credit value. A barrier to acceptance of an auto bank function is that usually the auto-banking of wins will deplete a player's credit balance more rapidly than where wins are added to the credit meter, and hence the player may perceive that they get less value from the amount wagered than without activating a bet keeper function. The applicant has realized that combining a bet keeper function with an auto-bank function mitigates against this concern by enabling a player to wager residual credits if their credit balance falls below a desired wager, or indeed, a minimum bet amount after a win as the player will have a chance to make an additional wager based on residual credits. Further, in some embodiments, the residual credit amount may not be able to be disbursed from the gaming machine or may not be able to be disbursed by a cash output device such as a coin hopper.

Further scenarios that may be aided by combining an auto-bank function and a bet keeper function include a scenario where the player elects to auto bank relatively large wins. In such a case, the player may perceive that small wins are more likely to occur than large wins. Hence, if a large win occurs when their credits are depleted, the player may feel a sense of disappointment that the win will not allow them to continue game play.

In this respect, a technique for wagering residual credits is described in earlier Australian patent application 2015202436 Australian patent, the disclosure of which is incorporated herein by reference. Embodiments of the disclosed technology, involve the processor 204 conducting a random trial having a probability of success proportional to a ratio of the residual credit balance to the desired wager amount to determine whether to conduct the subsequent game using the desired player selection as described in further detail below.

Figure 5:
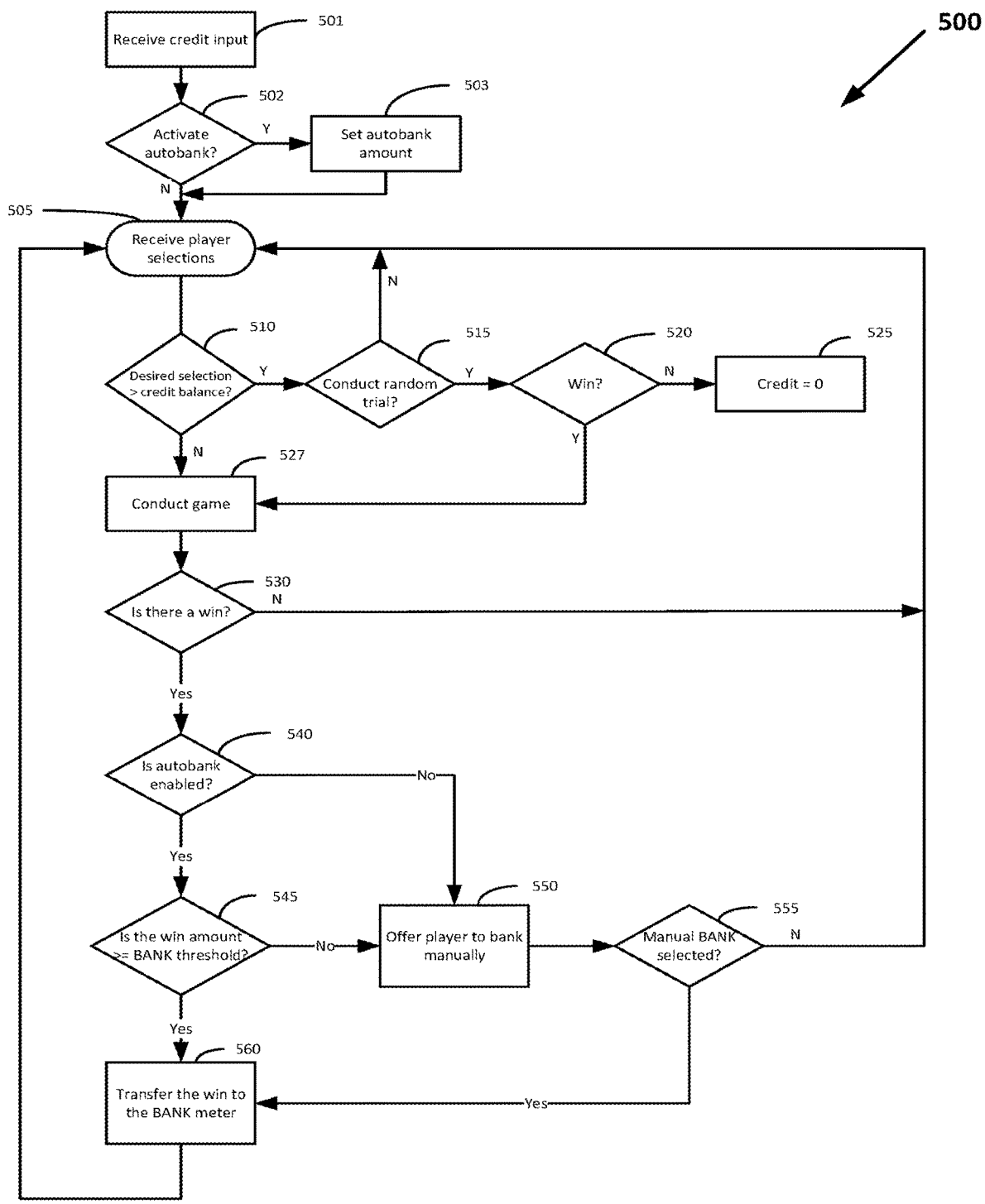
FIG. 5 is a flow chart of a method combining a bank function and a bet saver function.
Figure 6:
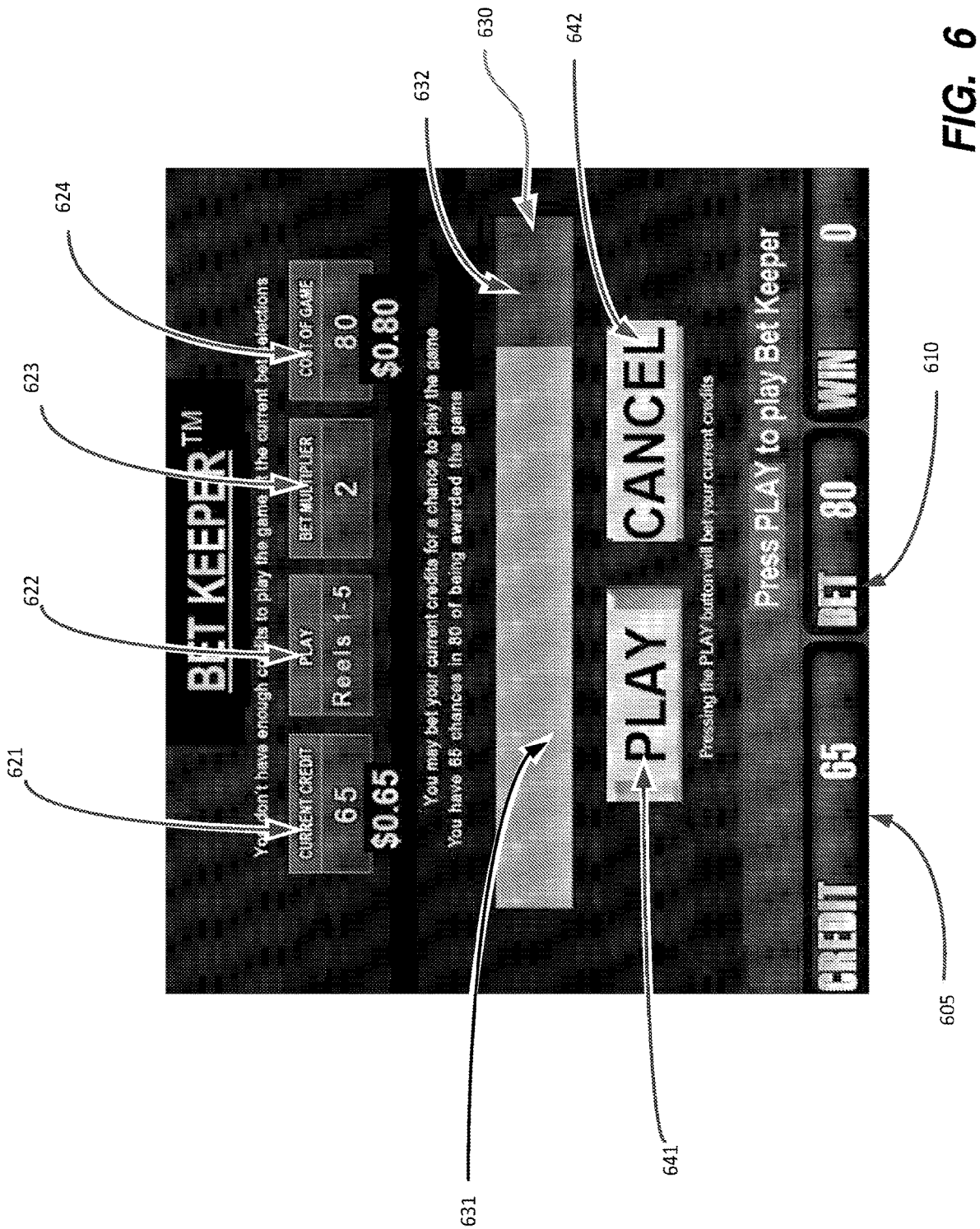
FIG. 6 is an example of a screen display in respect of a bet saver selection.

FIG. 5 shows a method of operating the gaming device 200. At step 501, the gaming device 200 receives an input of credits and establishes a credit balance on a credit meter in memory 208. At step 502, the processor 204 determines whether auto-bank function has been activated, by the player, and if so, sets 503 a bank threshold based on a player selection. In an example, the player can select from the options: $2 (for wins of $2 or more), $5, $10, "All wins", and "Other". If the player selects other, a key pad is presented on the display 240, where the user can enter another amount, e.g. $8. The monetary values (exemplified as $2, $5, $10 above) are monetary values that are controlled by the processor 204 and presented on buttons. The values can be dependent on the denomination of the game that is currently selected for play. In one example, $2, $5, $10 as default and for denominations<5 c; $5, $10, $20 for denominations 5 c to <50 c; $10, $20, $50 for denominations 50 c to $2; and $[denomination×4], $[denomination×5], $[denomination×10] for denominations higher than 2.

At step 505, the processor 204 receives player selections input via an input device such as buttons 236 that correspond to a desired wager amount. The processor 204 sets the received selections and hence the desired wager amount as default options in memory such that at the beginning of a subsequent game, at step 505, the player can confirm that they want to proceed with the desired wager amount (e.g., by pressing a play button of buttons 236) or make a fresh selection of a different wager.

At step 510, the processor determines whether the desired wager amount is more than the current (residual) credit balance. Where the player has just established a fresh credit balance, the desired wager will typically be less than the current credit balance. Accordingly, the processor 204 proceeds to step 527 and conducts a game, for example using the method described in relation to FIGS. 3 and 4.

From step 530 onwards, the processor 208 determines how to handle any winning amount with the auto-bank function. Accordingly, at step 530 the processor 204 determines whether there is a win (and hence whether the processor needs to carry out the auto-bank process). If there is not a win, the processor reverts to step 505 of receiving player selections. In this respect, the player will be presented with an option to make the same selections again. At this time, the player can choose to change their selections or even to cash out.

If at step 530 the processor determines that there is a win, the processor determines at step 540, whether auto-bank is enabled. If auto-bank is enabled, the processor 204 proceeds to step 545 where the processor determines whether the win amount is greater than or equal to the auto-bank threshold set at step 503.

If the win amount is above the set auto-bank threshold, the processor proceeds to step 560 and transfers the amount on the win meter to the bank meter in memory 208 before reverting to step 505.

Where the residual credit balance of the credit meter after a transfer is below a desired wager amount corresponding to a desired player selection at step 505 for a subsequent game after transfer of the win meter balance to the bank meter, at step 510, the processor 204 will determine that the desired selection is less than a residual credit balance, and the player is offered a chance to obtain the desired wager at step 515. In an example embodiment, as the processor defaults to offering the player an opportunity to place the prior wager again, where the wager set as the default wager based on the prior selection has a wager amount greater than the credit balance, the processor 204 proceeds automatically to step 510 and hence automatically offers the player the opportunity to conduct a random trial to place the prior wager at step 515.

In an example, at step 515 the processor 204 controls display 240 to display a bet keeper screen 600. The screen displays a current credit balance (e.g., 65 credits) 621 corresponding to the value on the credit meter 605, details of wager based on the player selections (which as indicated may be the prior selections), here a number of reels to play 622 and a bet multiplier 623 as well as the total cost of the wager (e.g., 80 credits) as indicated by bet amount 610. In certain embodiments, the processor 204 also controls the display to graphically represent to the player their prospects of success by displaying a chance bar 630 having a first portion 631 sized based on the chance of success and a second portion 632 sized based on the chance of failure. The processor 204 also controls display 240 to display play 641 and cancel 642 buttons. If the player presses cancel button, the processor reverts to step 505 where the player can elect to change their wager or cash out.

If the player elects to play by pressing play button, the processor 204 conducts a random trial having a probability of success proportional to a ratio of the residual credit balance to the desired wager amount to determine whether to conduct a further instance of the game using the desired player selection. In one example, the processor 204 does this by allocating possible values that can be returned from the RNG 212 to the two possible outcomes based on the ratio of the residual credit balance to the desired wager amount. For example, if the RNG can return values in the range of 0 to 1, values 0-0.8125 are allocated to the wager going ahead and values 0.8126 to 1 are allocated to the wager not going ahead. The processor 204 then employs RNG 212 to conduct a random trial and compares at step 520 the result to the set ranges to determine whether the player has won the additional wager. If there is a winning outcome, the processor 204 proceeds to step 527. If there is a losing outcome, the processor 204 sets the credit meter to zero at step 525.

As shown in FIG. 5, in the embodiment, the gaming device 200 also incorporates a manual bank function, where if auto-bank is not enabled or the win amount is less than the auto-bank threshold, the player is offered 550 and option to bank a win. At step 555, if manual bank is selected, the value on the win meter is transferred to the bank meter.

FIGS. 7 to 11 illustrate a method of operating a gaming device where the gaming device provides at least one activatable function such as the auto-bank function described above.

Figure 11:
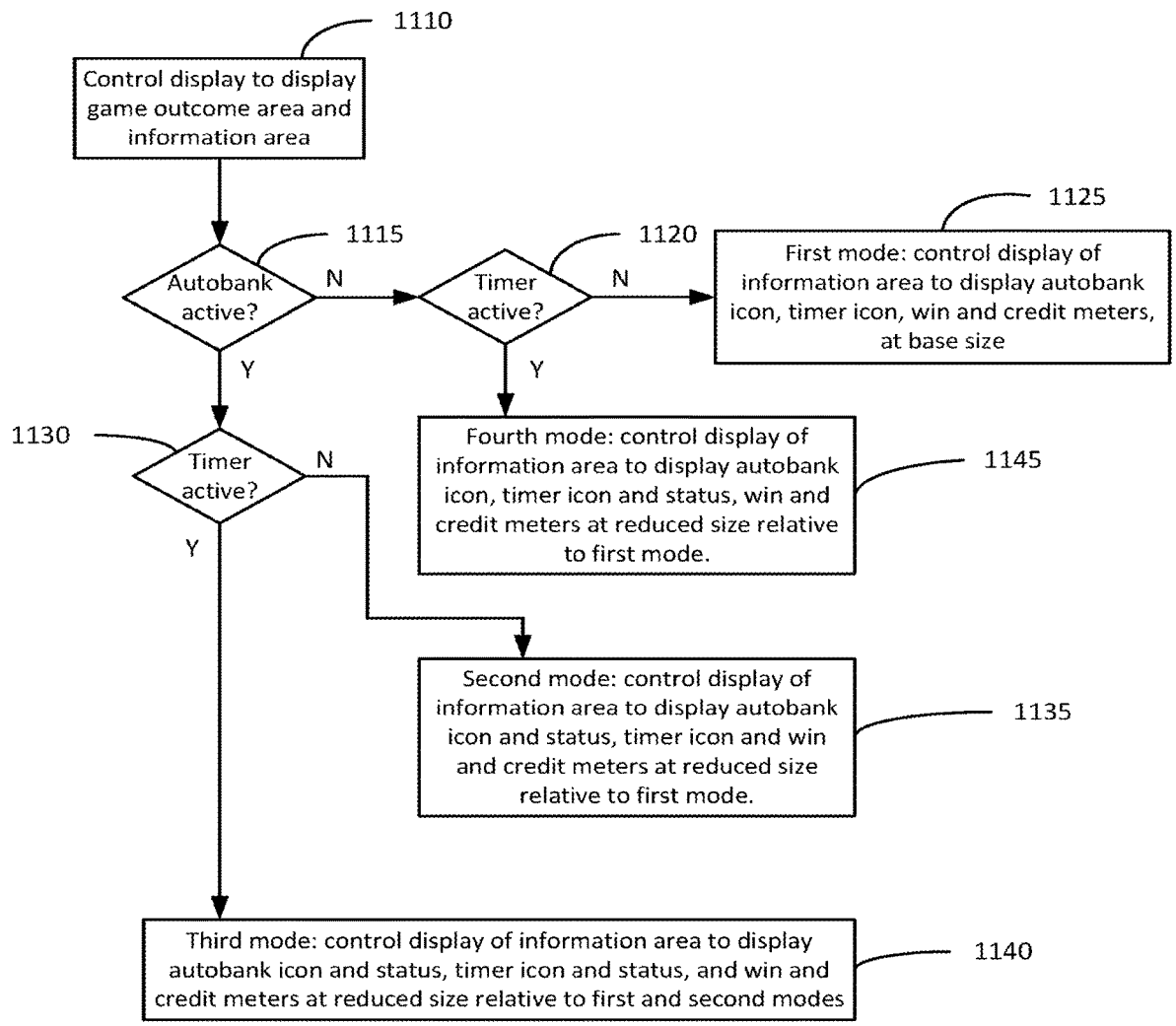
FIG. 11 is a flow chart of a method of controlling an information area of a display.

As shown in FIG. 11, at step 1110, the processor 204 controls the display 240 to display a game outcome area and an information area.

FIG. 7 illustrates an example display screen 700 displayed on display 240 under control of processor 204. The display screen 700 has a game outcome area 710 and an information area 720.

Figure 8:
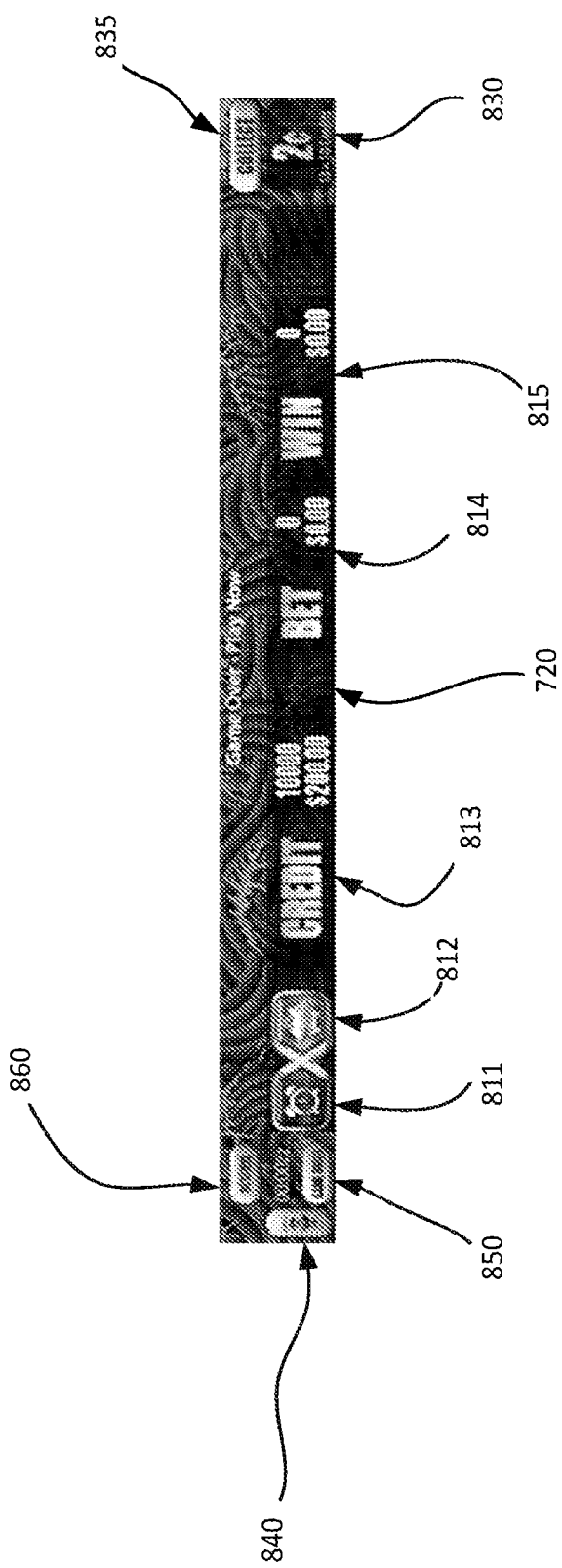
FIG. 8 is an example of a display of an information area.
Figure 12:
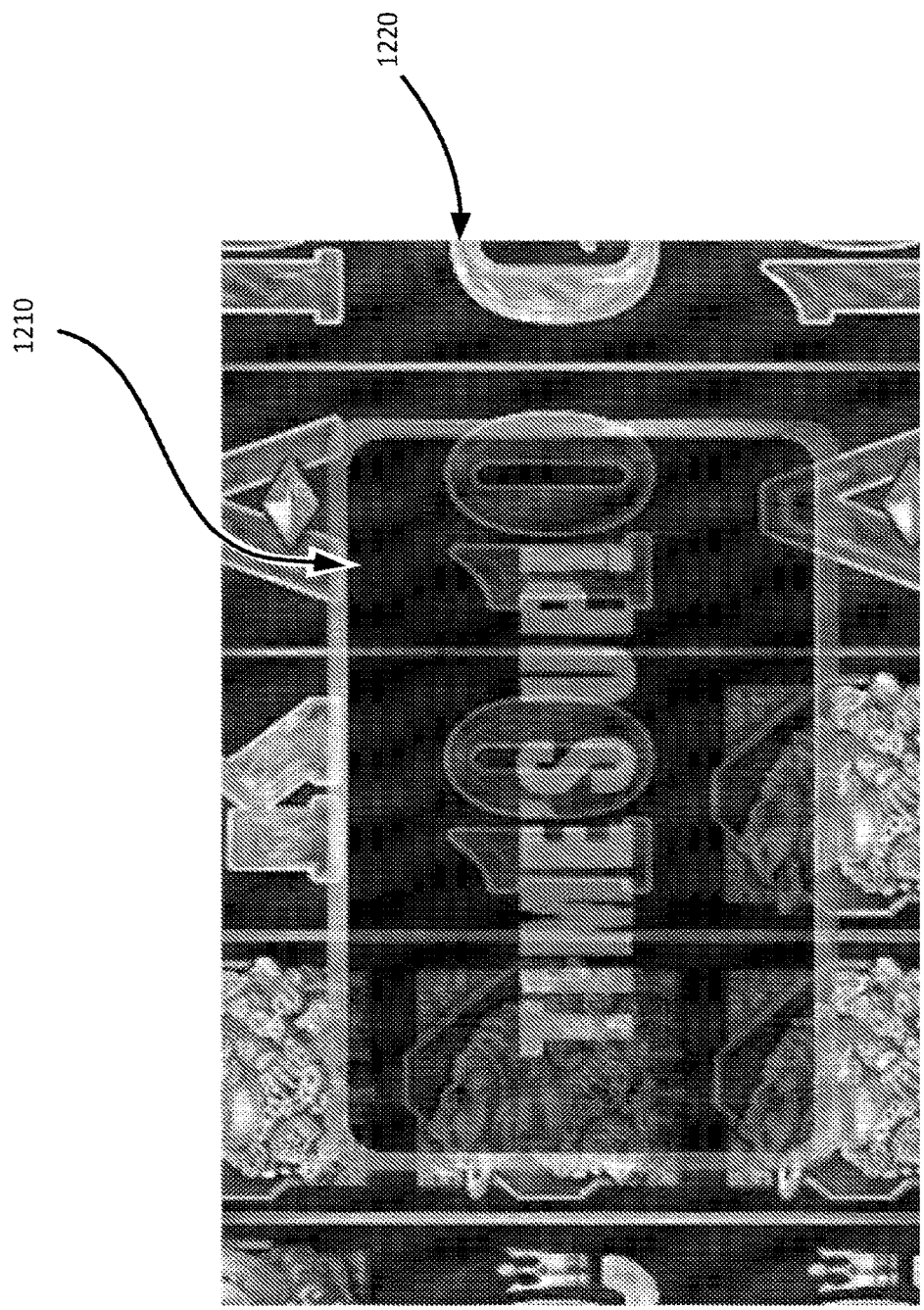
FIG. 12 is an example of a display of a timer message.

FIG. 8 shows an example of a sub-portion of the display screen 700 including the information area 720. The processor 204 also controls the display to display a sound volume button 840, a reserve button 860, a game rules button 850, a denomination value 830 and a collect button. FIG. 8 illustrates that in a first mode, the processor 204 controls the information area 720 to display a credit meter 813, a bet meter 814 and a win meter 815. Other embodiments may only display the credit meter and win meter or may display additional information. The processor 204 also controls the information area 720 to display function icons 811, 812, specifically a timer function icon 811 and an auto-bank function icon 812. In the first mode, both functions are inactive. When active the auto-bank function operates as described above. When the timer function is active, it activates a countdown clock at the end of which a warning message is displayed on screen 700. An example of warning message is the "Time's Up" banner message 1210 shown in FIG. 12 as overlaying a portion of the reels 1220. The transparency of the "Time's Up" banner 1210 allows the banner 1210 to be clearly visible while still allowing the game to continue on without interruption. This enables the timer message to be integrated without changing the game.

FIGS. 10A to 10D illustrate that there are four possible modes for the activatable function icons and their accompanying status information.

The first mode is entered into at step 1125 if the processor 204 determines (i) at step 1115 that the auto-bank function is inactive and (ii) at step 1120 that the timer function is inactive.

Figure 10A:
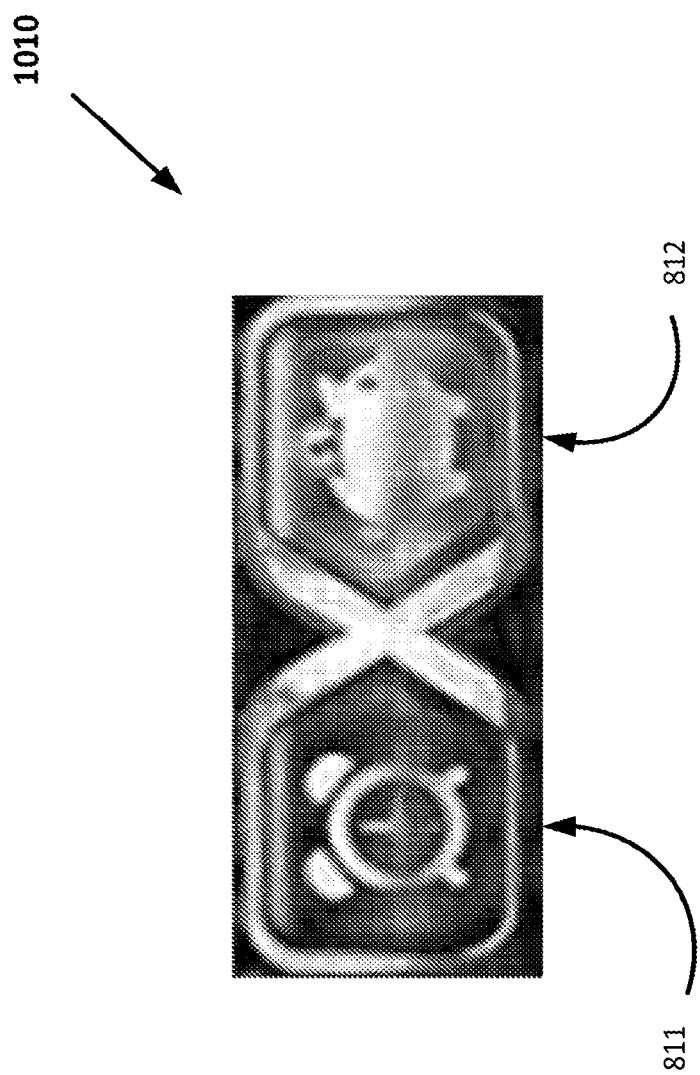
FIGS. 10A to 10D show possible display states of activatable function symbols and their associated status information.

FIG. 10A shows that in the first mode 1010 (also shown in FIG. 8) the processor 204 controls the display 204 so that the timer function icon 811 and auto-bank function icon 812 are displayed in a sub-portion of the information area 720.

The second mode is entered into at step 1135 if the processor 204 determines (i) at step 1115 that the auto-bank function is active and (ii) at step 1130 that the timer function is inactive.

Figure 10B:
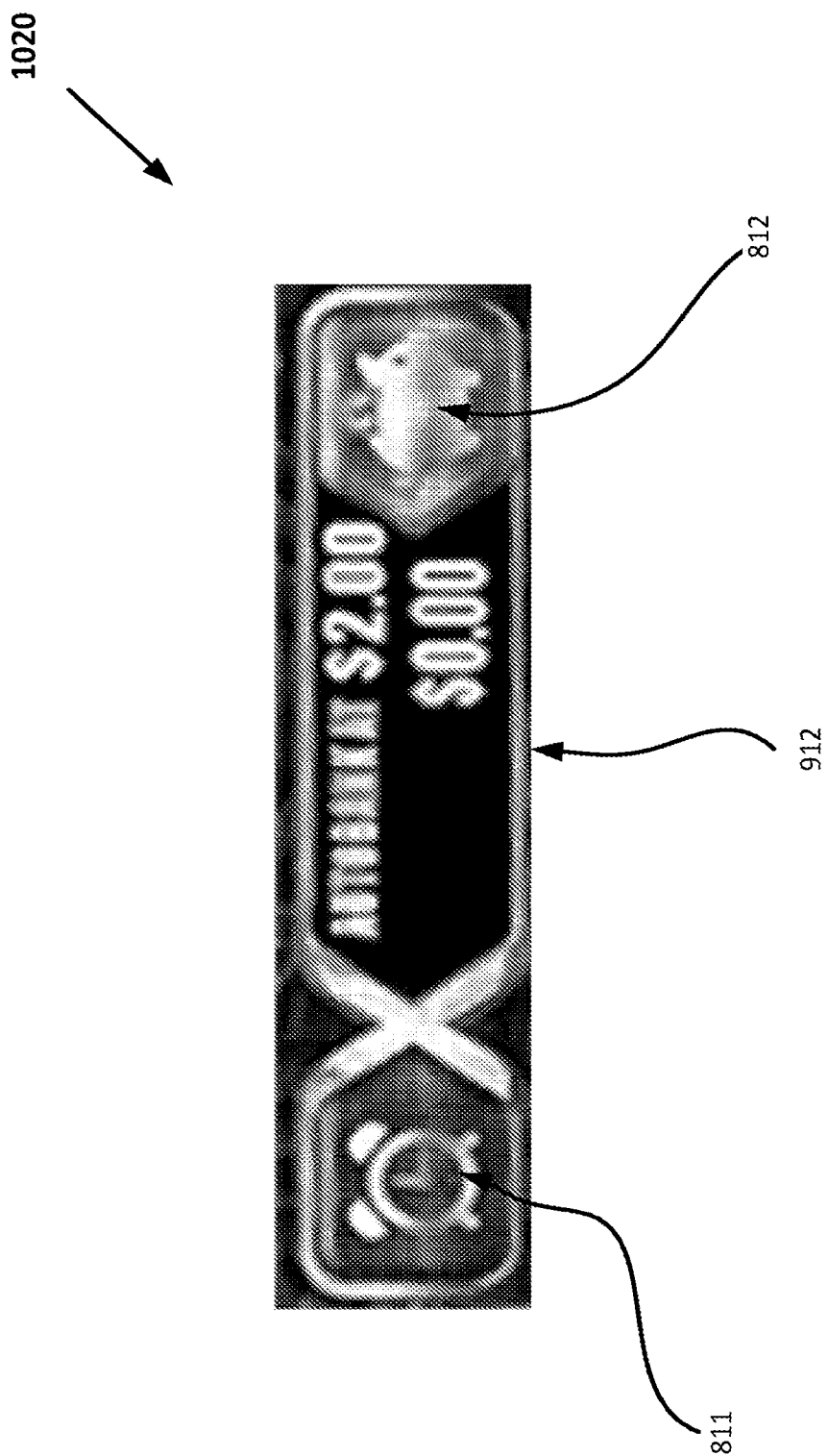

FIG. 10B shows the second mode 1020 where the timer function icon 811 is displayed while the auto-bank function icon 812 is displayed in conjunction with status information 912.

The third mode is entered into at step 1140 if the processor 204 determines (i) at step 1115 that the auto-bank function is active and (ii) at step 1130 that the timer function is active.

Figure 9:
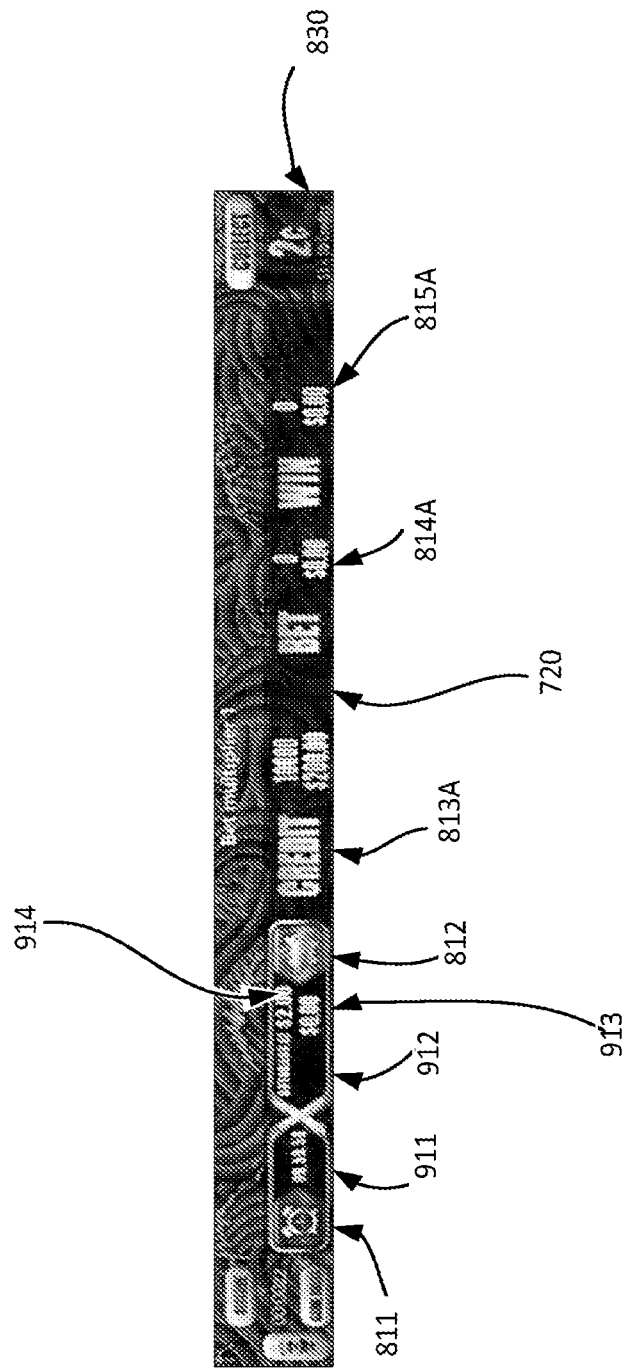
FIG. 9 is an example of a display of an information area modified in response to activation of two activatable functions.
Figure 10C:
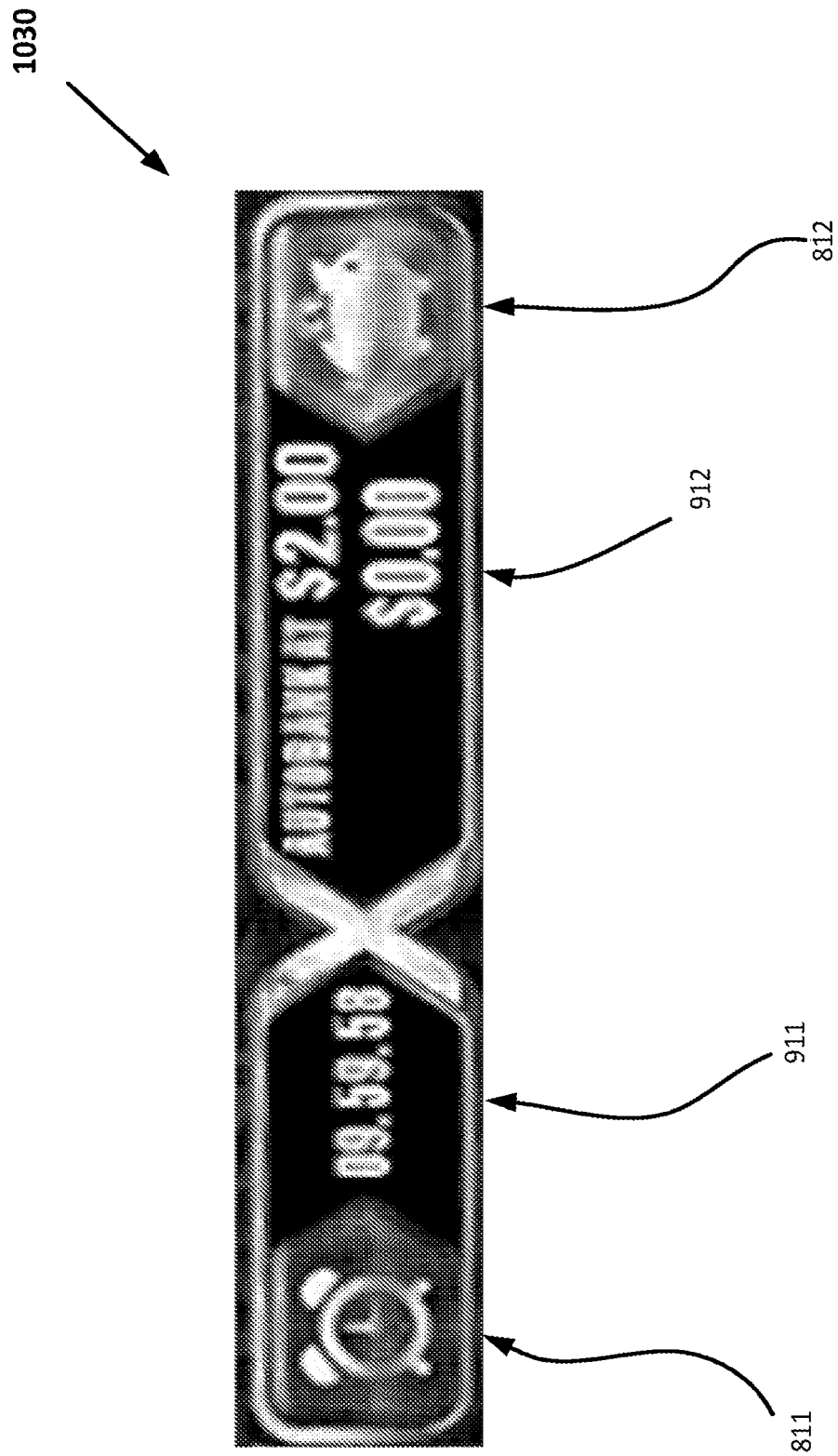

FIG. 10C shows the third mode 1030 (also shown in FIG. 9) where the timer function icon 811 and auto-bank function icon 812 are both displayed in conjunction with their respective items of status information 911, 912.

The fourth mode is entered into at step 1145 if the processor 204 determines (i) at step 1115 that the auto-bank function is inactive and (ii) at step 1120 that the timer function is active.

Figure 10D:
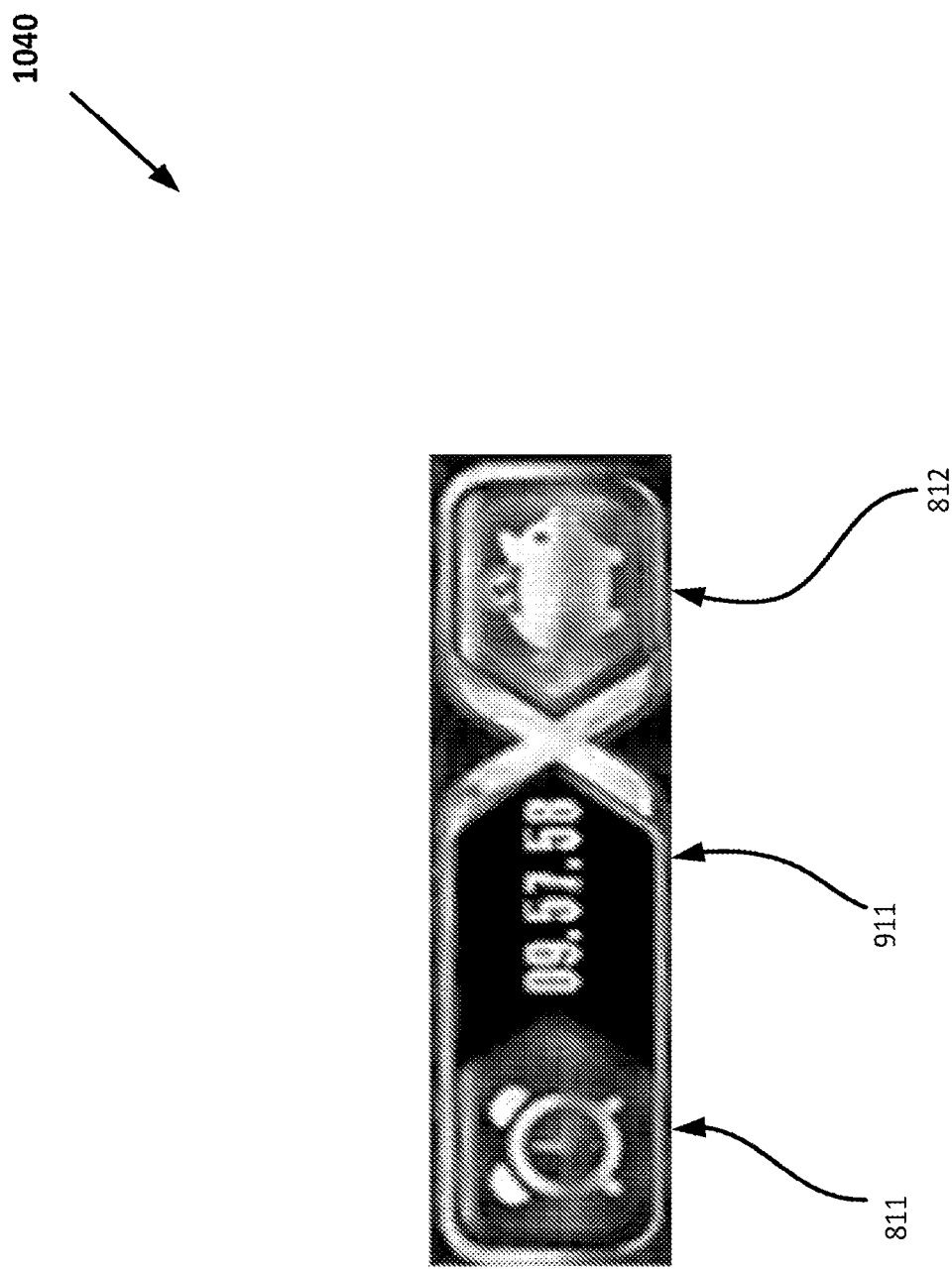

FIG. 10D shows a fourth mode 1040 where the timer function icon 811 is displayed in conjunction with status information 911 while the auto-bank function icon 812 is displayed.

FIG. 9 illustrates the information area 720 in the third mode—e.g., when both the timer function and the auto-bank functions are active. In the third mode status information 911, 912 is displayed for both the timer function and the auto-bank function. The status information 911 for the timer function is a current value of a countdown clock. The status information 912 for the auto-bank function is a current value of the bank meter 913 and the set threshold 914 for the auto-bank function. As will be apparent from a comparison of FIG. 9 and FIG. 8 the representations of the credit meter 813A, bet meter 814A and win meter 815A have been adjusted to a smaller size relative to the first mode in order to accommodate display of the status information. As two items of status information are displayed in the third mode the credit meter 813A, bet meter 814A and win meter 815A are also smaller in size relative to the second and fourth modes. (The credit meter, bet meter and win meter are smaller in size in the second and fourth mode than in the first mode.) In the embodiments of FIGS. 8, 9, 10A-10D, the display of status information 911 and 912 is accompanied or achieved by extension of icons 811 and 812, respectively. The extension of icons 811 and/or 812 graphically indicates activation of the corresponding activatable function(s). Similarly, the contraction (or a lack of extension) of icons 811 and/or 812 graphically indicates inactivation of the corresponding activatable function(s). These graphical indications of the activation states are alternative to, or in addition to, the presence or absence of status information 911 and 912.

Dynamically adjusting the information area enables the player to see the existence and/or activation states of the additional functions without status information taking up space unless necessary.

If the processor 204, determines that the gaming machine is inactive, for example, after 30 seconds with no money on the credit meter or the bank meter, the processor 204 controls the icons to return to the first mode.

In an alternative embodiment, where there is a single activatable function, there are two modes: with and without status information.

In an example embodiment, a gaming device comprises:
a processor;
a credit input device;
a credit meter, a win meter, and a bank meter; and
a memory storing instructions which when executed by the processor cause the processor to:
control access to the bank meter such that any credit amount added to the bank meter cannot be accessed for wagering on the gaming device and a balance of the bank meter can only be accessed by a player upon entering a cash out instruction;
establish a credit balance on the credit meter responsive to receipt of a monetary amount via the credit input device;
receive an instruction from a player specifying an automatic bank condition in respect of a win amount;
receive a player selection in respect of a play of a game on the gaming device that defines a wager amount;
decrement the credit balance of the credit meter by the wager amount;
generate a game outcome;
add a win amount resulting from the game outcome to the win meter to contribute to a win meter balance;
upon the win amount added to the win meter satisfying the automatic bank condition, transfer the win meter balance to the bank meter; and
upon a residual credit balance of the credit meter being below a desired wager amount corresponding to a desired player selection for a subsequent game after transfer of the win meter balance to the bank meter, conduct a random trial having a probability of success proportional to a ratio of the residual credit balance to the desired wager amount to determine whether to conduct the subsequent game using the desired player selection.

In an example embodiment, when the instructions are executed by the processor they cause the processor to, upon the win amount added to the win meter not satisfying the automatic bank condition, transfer the win meter balance to the credit meter.

In an example embodiment, the residual credit balance is an amount that cannot be disbursed by a cash output device of the gaming machine.

In an example embodiment, the credit meter, the win meter, and the bank meter are stored in the memory.

In another example embodiment, a method is provide for operating a gaming device comprising a processor, a credit input device, a credit meter, a win meter, and a bank meter, the method comprising:
controlling access to the bank meter such that any credit amount added to the bank meter cannot be accessed for wagering on the gaming device and a balance of the bank meter can only be accessed by a player upon entering a cash out instruction;

establishing a credit balance on the credit meter responsive to receipt of a monetary amount via the credit input device;

receiving an instruction from a player specifying an automatic bank condition in respect of a win amount;

receiving a player selection in respect of a play of a game on the gaming device that defines a wager amount;

decrementing the credit balance of the credit meter by the wager amount;

generating a game outcome;

adding a win amount resulting from the game outcome to the win meter to contribute to a win meter balance;

upon the win amount added to the win meter satisfying the automatic bank condition, transferring the win meter balance to the bank meter; and upon a residual credit balance of the credit meter being below a desired wager amount corresponding to a desired player selection for a subsequent game after transfer of the win meter balance to the bank meter, conducting a random trial having a probability of success proportional to a ratio of the residual credit balance to the desired wager amount to determine whether to conduct the subsequent game using the desired player selection.

In an example embodiment, upon the win amount added to the win meter not satisfying the automatic bank condition, transferring the win meter balance to the credit meter.

In an example embodiment, the residual credit balance is an amount that cannot be disbursed by a cash output device of the gaming machine.

In an example embodiment, the credit meter, the win meter, and the bank meter are stored in a memory of the gaming device.

In another example embodiment, there is provided a gaming device comprising:

an electronic display;
a processor;
a credit meter and a win meter; and
a memory storing instructions which when executed by the processor cause the processor to:
control the display to display a plurality of areas including a game outcome area in which outcomes of an electronic game of chance are displayed and an information area having a fixed size,
control display of the information area, in a first mode in which an activatable function is inactive, to visually display each of the win meter, the credit meter, and a current bet amount, and a first icon corresponding to the activatable function; and
responsive to activation of the activatable function, control, in a second mode, display of the information area to visually display the first icon in an extended state and to adjust display of at least one of the win meter, the credit meter, and the current bet amount relative to the first mode to accommodate display of the first icon in the extended state.

In an example embodiment, the activatable function is a first activatable function and there is a second activatable function, and in the first mode, the processor controls the information area to also display a second icon corresponding to the second activatable function.

In an example embodiment, responsive to activation of the of the second activatable function, the processor controls, in a third mode, display of the information area to also visually display the second icon in an extended state and to further adjust display of at least one of the win meter, the credit meter, and the current bet amount relative to the second mode to accommodate display of the second icon in the extended state.

In an example embodiment, responsive to activation of the second activatable function without activation of the first activatable function, the processor controls, in a fourth mode, display of the information area to visually display the second icon in an extended state and to adjust display of at least one of the win meter, the credit meter, and the current bet amount relative to the first mode to accommodate display of the second icon in the extended state.

In an example embodiment, displaying the first icon in the extended state includes displaying status information related to the first activatable function.

In an example embodiment, the first activatable function is a bank function and the gaming device comprises a bank meter, and wherein the status information of the first activatable function includes a balance of the bank meter.

In an example embodiment, the status information of the first activatable function includes an amount that will trigger a banking function.

In an example embodiment, displaying the second icon in the extended state includes displaying status information related to the second activatable function.

In an example embodiment, the second activatable function is a timer function, and the status information of the second activatable function is a countdown clock.

In another example embodiment, there is provided a method of operating a gaming device comprising an electronic display, a processor, a credit meter, and a win meter, the method comprising:

controlling the display to display a plurality of areas including a game outcome area in which outcomes of an electronic game of chance are displayed and an information area having a fixed size, controlling display of the information area, in a first mode in which an activatable function is inactive, to visually display each of the win meter, the credit meter, and a current bet amount, and a first icon corresponding to the activatable function; and responsive to activation of the activatable function, controlling, in a second mode, display of the information area to visually display the first icon in an extended state and to adjust display of at least one of the win meter, the credit meter, and the current bet amount relative to the first mode to accommodate display of the first icon in the extended state.

In an example embodiment, the activatable function is a first activatable function and there is a second activatable function, and in the first mode, the method comprises controlling the information area to also display a second icon corresponding to the second activatable function.

In an example embodiment, responsive to activation of the of the second activatable function, the method comprises controlling, in a third mode, display of the information area to also visually display the second icon in an extended state by further adjusting display of at least one of the win meter, the credit meter, and the current bet amount relative to the second mode to accommodate display of the second icon in the extended state.

In an example embodiment, responsive to activation of the second activatable function without activation of the first activatable function, the method comprises controlling, in a fourth mode, display of the information area to visually display the second icon in an extended state by adjusting display of at least one of the win meter, the credit meter, and the current bet amount relative to the first mode to accommodate display of the second icon in the extended state.

In an example embodiment, displaying the first icon in the extended state includes displaying status information related to the first activatable function.

In an example embodiment, the first activatable function is a bank function and the gaming device comprises a bank meter, and wherein the status information of the first activatable function includes a balance of the bank meter.

In an example embodiment, the status information of the first activatable function includes an amount that will trigger a banking function.

In an example embodiment, displaying the second icon in the extended state includes displaying status information related to the second activatable function.

In an example embodiment, the second activatable function is a timer function, and the status information of the second activatable function is a countdown clock.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming system comprising:
   a processor; and
   a memory storing instructions which, when executed by the processor, cause the processor to perform operations, the operations comprising:
      controlling access to a bank meter such that credit amounts added to the bank meter cannot be accessed for wagering on a gaming device and a balance of the bank meter can be accessed by a player upon entering a cash out instruction;
      establishing a credit balance on a credit meter responsive to receipt of a monetary amount via a credit input device;
      receiving an instruction from the player specifying an automatic bank condition in respect of a win amount;
      in response to receiving the instruction, indicating that an automatic banking feature is active by increasing a size of an automatic banking icon and decreasing sizes of icons associated with the credit meter and a win meter;
      receiving a player selection in respect of a play of a game on the gaming device that defines a wager amount;
      decrementing the credit balance of the credit meter by the wager amount;
      adding a win amount resulting from a game outcome to the win meter to contribute to a win meter balance; and
      upon the win amount added to the win meter satisfying the automatic bank condition, transferring the win meter balance to the bank meter.

2. The gaming system of claim 1, wherein the operations further comprise, upon a residual credit balance of the credit meter being below a desired wager amount for a subsequent game after the transfer of the win meter balance to the bank meter, conducting a random trial having a probability of success based on the residual credit balance and the desired wager amount to determine whether to conduct the subsequent game at the desired wager amount.

3. The gaming system of claim 2, wherein the operations further comprise conducting the subsequent game when the random trial is successful.

4. The gaming system of claim 2, wherein the residual credit balance is an amount that cannot be disbursed by a cash output device of the gaming device.

5. The gaming system of claim 1, wherein the credit input device comprises a coin acceptor.

6. The gaming system of claim 1, wherein the credit input device comprises a bill validator.

7. The gaming system of claim 1, wherein the credit input device accepts cash.

8. The gaming system of claim 1, wherein the credit input device accepts a ticket voucher.

9. The gaming system of claim 1, wherein the operations further comprise controlling a display to display the automatic banking icon and the icons associated with the credit meter and the win meter.

10. The gaming system of claim 1, wherein the generating the game outcome uses a random number generator.

11. The gaming system of claim 1, wherein the generating the game outcome maintains a target return to player.

12. The gaming system of claim 1, wherein the automatic bank condition is specified as a threshold amount at or above which the automatic bank condition is satisfied.

13. The gaming system of claim 1, wherein the automatic bank condition is satisfied for any value of the win amount.

14. The gaming system of claim 1, wherein the operations further include displaying status information for the automatic bank condition on a display with the automatic banking icon.

15. A method implemented by at least one processor in communication with at least one memory, the method comprising:
   controlling access to a bank meter such that a credit amount added to the bank meter cannot be accessed for wagering on a gaming device and a balance of the bank meter can is accessible by a player upon entering a cash out instruction;
   establishing a credit balance on a credit meter responsive to receipt of a monetary amount via a credit input device;
   receiving an instruction from the player specifying an automatic bank condition in respect of a win amount;
   in response to receiving the instruction, indicating that an automatic banking feature is active by increasing a size of an automatic banking icon and decreasing sizes of icons associated with the credit meter and a win meter;
   receiving a player selection in respect of a play of a game on the gaming device that defines a wager amount;
   decrementing the credit balance of the credit meter by the wager amount;
   adding a win amount resulting from a game outcome to the win meter to contribute to a win meter balance; and
   upon the win amount added to the win meter satisfying the automatic bank condition, transferring the win meter balance to the bank meter.

16. The method of claim 15, wherein the increasing the size of the automatic banking icon includes adding status information for the automatic bank condition.

17. The method of claim 16, wherein the status information includes a threshold amount at or above which the automatic bank condition is satisfied.

18. A computer program product comprising:
   first instructions stored in a non-transitory storage medium and executable by at least one processor to control access to a bank meter such that at least one credit amount added to the bank meter cannot be accessed for wagering on a gaming device and a balance of the bank meter is able to be accessed by a player upon entering a cash out instruction;

second instructions stored in the non-transitory storage medium and executable by the at least one processor to establish a credit balance on a credit meter responsive to receipt of a monetary amount via a credit input device;

third instructions stored in the non-transitory storage medium and executable by the at least one processor to receive an instruction from the player specifying an automatic bank condition in respect of a win amount;

fourth instructions stored in the non-transitory storage medium and executable by the at least one processor to, in response to receiving the instruction, indicate that an automatic banking feature is active by increasing a size of an automatic banking icon and decreasing sizes of icons associated with the credit meter and a win meter;

fifth instructions stored in the non-transitory storage medium and executable by the at least one processor to receive a player selection in respect of a play of a game on the gaming device that defines a wager amount;

sixth instructions stored in the non-transitory storage medium and executable by the at least one processor to decrement the credit balance on the credit meter by the wager amount;

seventh instructions stored in the non-transitory storage medium and executable by the at least one processor to add a win amount resulting from a game outcome to the win meter to contribute to a win meter balance; and eighth instructions stored in the non-transitory storage medium and executable by the at least one processor to, upon the win amount added to the win meter satisfying the automatic bank condition, transfer the win meter balance to the bank meter.

19. The computer program product of claim 18, wherein the increasing the size of the automatic banking icon includes adding status information for the automatic bank condition.

20. The computer program product of claim 19, wherein the status information includes the balance of the bank meter.

* * * * *